No. 620,320. Patented Feb. 28, 1899.
G. E. HOEY.
JOINT FOR GLASS TUBING.
(Application filed Jan. 11, 1898.)
(No Model.)
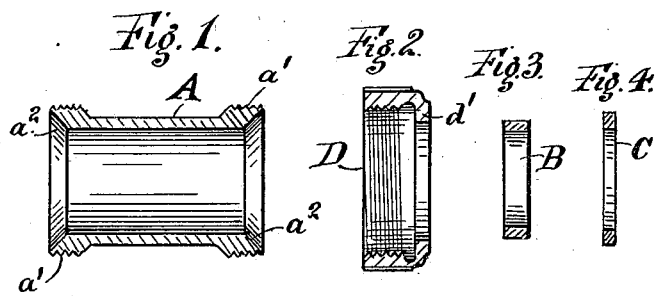
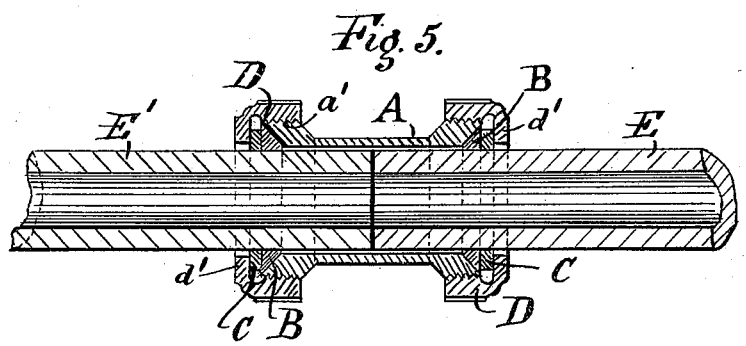
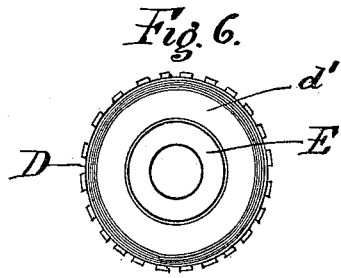
Witnesses
T. Cosford
G. Gledhill
Inventor
George Edwin Hoey
per H. F. Boughton
attorney.
THE NORRIS PETERS CO., PHOTO-LITHO., WASHINGTON, D. C.

UNITED STATES PATENT OFFICE.

GEORGE EDWIN HOEY, OF BARNSLEY, ENGLAND.

JOINT FOR GLASS TUBING.

SPECIFICATION forming part of Letters Patent No. 620,320, dated February 28, 1899.

Application filed January 11, 1898. Serial No. 666,310. (No model.)

*To all whom it may concern:*

Be it known that I, GEORGE EDWIN HOEY, a subject of the Queen of Great Britain, and a resident of 51 Huddersfield road, Barnsley, in the county of York, England, have invented a certain new and useful Improvement in Joints for Coupling Together Lengths of Glass Tubing Used in Drawing Off Beer, (for which I have obtained provisional protection in Great Britain, No. 15,709, dated July 26,1897,) of which the following is a full, clear, and exact specification.

My invention relates to an improvement in joints for coupling together lengths of glass tubing used in drawing off beer; and the object of my improvement is to so arrange a joint that lengths of plain glass tubing made without flanges may be coupled together and the said joints hermetically sealed and made to withstand a large amount of internal fluid and gaseous pressure. By this means the advantages in cleanliness and purity in the use of glass tubing in preference to the usual lead or metal piping hitherto employed for the drawing off of beer and other beverages is made practical, and glass tubing can hereby be generally used for the purposes stated in place of lead or other metal tubing, whereas hitherto as no useful adaptable or economical joint had been discovered it was impossible without great cost to use glass tubing to advantage for the purposes described. I therefore attain this object by the arrangement of joint illustrated in the accompanying drawings, in which—

Figure 1 is a sectional elevation of a screw-ended cylinder. Fig. 2 is a sectional elevation of a screw-cap. Fig. 3 is a sectional elevation of a flexible ring, and Fig. 4 a sectional elevation of a leather washer. Fig. 5 is a sectional elevation of my improved joint complete with glass tubings, and Fig. 6 is an end view of same.

Similar letters refer to similar parts throughout the several views.

The cylinder A has a thread $a'$ formed on each outside circumference near each end thereof, and each inner end of cylinder A is formed with an annular beveled or tapered part $a^2$ for the reception of the flexible ring B, and at the back of each ring B, I place a leather washer C for the purpose hereinafter described.

I employ two internally-screwed caps D, having their outer circumferences milled, so they may be firmly gripped by the fingers of the operator, and the outer end of each said cap D is formed with an annular flange $d'$ for the purpose of bearing against the leather washer C, and so the latter takes the friction off the flexible ring B, which otherwise would soon become worn.

One screw-thread $a'$ of the cylinder A is right-handed and the opposite thread is left-handed, and the threads of the respective caps D correspond therewith.

In forming my improved joint by the aid of the parts described I place a ring B and then a washer C on each separate part of the glass tubing E and E', (see Fig. 5,) and after the ends of said tubings have been filed or ground, so as to be capable of firmly meeting together, they are brought together within the cylinder A, and the caps D, which have been previously placed on the tubings, are then screwed up on the cylinder A, one with one hand and the other with the opposite hand of the operator, by which means the lateral pressure on the washers C and rings B is by the aid of the annular tapered or beveled parts $a^2$ of the cylinder A transformed into a centripetal pressure, and so hermetically seals the circumferences of each part of glass tubing E and E' within the joint, which joint is then capable of withstanding a large amount of internal pressure.

I am aware that prior to my invention screw-caps have been used for pressing washers up to flanges, and glands have been used, as in the spindles of valves and piston-rods of steam and other engines; but my invention has no reference to glands; neither does it relate to flanged tubing. I therefore do not claim a screw-cap or ordinary gland; but What I do claim as my invention, and desire to secure by Letters Patent, is—

In a joint for coupling together lengths of glass tubing used in the drawing off of beer and arranged so as to prevent any undue or rigid pressure on said glass tubing and to allow freedom or slight movement of the joint without the risk of breakage and at the same time to preserve a hermetically-sealed joint, the combination of a parallel sleeve having its ends broadly or abruptly flared inwardly, rectangular pliable washers, and screw-caps, the angle of taper or flared ends of sleeve being such that only a moderate radially-compressive strain upon the glass pipes is obtainable when the caps are screwed up and the pliable washers conformed thereto.

In testimony that I claim the foregoing I have hereunto set my hand this 29th day of December, 1897.

GEORGE EDWIN HOEY.

Witnesses:
 ROBERT D. MADDISON,
 HAROLD BASHFORTH.